US010229401B2

(12) United States Patent
Yoakim

(10) Patent No.: US 10,229,401 B2
(45) Date of Patent: *Mar. 12, 2019

(54) BEVERAGE MACHINE IN A NETWORK

(71) Applicant: NESTEC S.A., Vevey (CH)

(72) Inventor: Alfred Yoakim, St-legier-la Chiesaz (CH)

(73) Assignee: Nestec S.A., Vevey (CH)

(*) Notice: Subject to any disclaimer, the term of this patent is extended or adjusted under 35 U.S.C. 154(b) by 624 days.

This patent is subject to a terminal disclaimer.

(21) Appl. No.: 14/831,481

(22) Filed: Aug. 20, 2015

(65) Prior Publication Data

US 2015/0356536 A1 Dec. 10, 2015

Related U.S. Application Data

(63) Continuation of application No. 13/395,057, filed as application No. PCT/EP2010/063096 on Sep. 7, 2010, now Pat. No. 9,138,096.

(30) Foreign Application Priority Data

Sep. 9, 2009 (EP) .................................... 09169800

(51) Int. Cl.
G06Q 30/00 (2012.01)
G06Q 20/18 (2012.01)
(Continued)

(52) U.S. Cl.
CPC .......... *G06Q 20/18* (2013.01); *A47J 31/4403* (2013.01); *A47J 31/52* (2013.01);
(Continued)

(58) Field of Classification Search
CPC ........ A47J 31/52; A47J 31/40; A47J 31/4403; G06Q 30/0601; G06Q 10/087;
(Continued)

(56) References Cited

U.S. PATENT DOCUMENTS 4,377,049 A 3/1983 Simon et al.
4,458,735 A 7/1984 Houman
(Continued)

FOREIGN PATENT DOCUMENTS

AT 410377 4/2003
AU 2006217656 8/2006
(Continued)

OTHER PUBLICATIONS

Russia Office Action for Application No. 2012113712, dated Mar. 10, 2015, 8 pages.
(Continued)

Primary Examiner — Naeem U Haq
(74) Attorney, Agent, or Firm — K&L Gates LLP

(57) ABSTRACT

A method for preventing shortage at a customer location of consumable ingredient capsules for use in a machine for preparing a beverage, the beverage preparation machine at the customer location being distant from a capsule supplier and in data-exchange connection with a server of the capsule supplier to form a network. The method can comprise: supplying from the capsule supplier a stock of consumable ingredient capsules to the customer location; automatically monitoring via the network consumption of the consumable ingredient capsules in the beverage preparation machine; and whenever the automatic monitoring detects a reaching of a shortage of consumable ingredient capsules at the customer location, the supplier server generating automatically an instruction: a) to invite the customer to make an order for a shipment of a new stock of capsules, or b) to prepare a shipment of a new stock of capsules for supply to said customer.

3 Claims, 1 Drawing Sheet

(51) Int. Cl.
- *A47J 31/44* (2006.01)
- *B65D 85/804* (2006.01)
- *G06Q 30/06* (2012.01)
- *A47J 31/52* (2006.01)
- *G06Q 10/08* (2012.01)
- *G07F 9/02* (2006.01)
- *G07F 13/06* (2006.01)

(52) U.S. Cl.
CPC ....... *B65D 85/8046* (2013.01); *G06Q 10/087* (2013.01); *G06Q 30/0601* (2013.01); *G06Q 30/0635* (2013.01); *G07F 9/026* (2013.01); *G07F 13/06* (2013.01)

(58) Field of Classification Search
CPC .... G06Q 20/18; G06Q 30/0635; G07F 13/06; B67D 1/08; B67D 1/00; B65D 85/8046
See application file for complete search history.

(56) References Cited

U.S. PATENT DOCUMENTS

| | | | |
|---|---|---|---|
| 4,554,419 | A | 11/1985 | King et al. |
| 4,767,632 | A | 8/1988 | Meier |
| 4,954,697 | A | 9/1990 | Kokubun et al. |
| 5,312,020 | A | 5/1994 | Frei |
| 5,335,705 | A | 8/1994 | Morishita et al. |
| 5,372,061 | A | 12/1994 | Albert et al. |
| 5,375,508 | A | 12/1994 | Knepler et al. |
| 5,402,707 | A | 4/1995 | Fond et al. |
| 5,608,643 | A | 3/1997 | Wichter et al. |
| 5,645,230 | A | 7/1997 | Marogna et al. |
| 5,731,981 | A | 3/1998 | Simard |
| 5,836,236 | A | 11/1998 | Rolfes et al. |
| 5,959,869 | A | 9/1999 | Miller et al. |
| 6,182,555 | B1 | 2/2001 | Scheer et al. |
| 6,354,341 | B1 | 3/2002 | Saveliev et al. |
| 6,751,525 | B1 * | 6/2004 | Crisp, III ............. B67D 1/0057 222/25 |
| 6,759,072 | B1 | 7/2004 | Gutwein et al. |
| 6,941,855 | B2 * | 9/2005 | Denisart ............. A47J 31/3628 221/113 |
| 8,876,000 | B2 | 11/2014 | Delbreil et al. |
| 2003/0191558 | A1 | 10/2003 | Arellano |
| 2004/0089158 | A1 | 5/2004 | Mahlich |
| 2004/0237793 | A1 | 12/2004 | Zurcher et al. |
| 2005/0034606 | A1 | 2/2005 | In Albon |
| 2007/0157820 | A1 | 7/2007 | Bunn |
| 2009/0031901 | A1 | 2/2009 | Peden et al. |
| 2009/0293733 | A1 | 12/2009 | Martin et al. |
| 2011/0110180 | A1 | 5/2011 | Snider et al. |
| 2012/0173357 | A1 | 7/2012 | Yoakim |
| 2012/0245732 | A1 | 9/2012 | Yoakim |

FOREIGN PATENT DOCUMENTS

| | | |
|---|---|---|
| CH | 682798 | 11/1993 |
| CN | 101419734 | 4/2009 |
| DE | 4429353 | 2/1996 |
| DE | 20200419 | 4/2002 |
| DE | 20 2006019039 | 3/2004 |
| DE | 2007008590 | 1/2007 |
| EP | 1302138 | 4/2003 |
| EP | 1365337 | 11/2003 |
| EP | 1448084 | 8/2004 |
| EP | 1541070 | 6/2005 |
| EP | 1676509 | 7/2006 |
| EP | 1855571 | 11/2007 |
| EP | 9053368 | 2/2011 |
| EP | 8155851 | 9/2011 |
| FR | 2624844 | 6/1989 |
| GB | 2397510 | 7/2004 |
| GB | 2438803 | 12/2007 |
| GB | 2451005 | 1/2009 |
| GB | 2452607 | 3/2009 |
| JP | 04224716 | 8/1992 |
| JP | 200316724 | 11/2000 |
| JP | 201175719 | 6/2001 |
| JP | 2001229466 | 8/2001 |
| JP | 2001273549 | 10/2001 |
| JP | 2001325351 | 11/2001 |
| JP | 2002318678 | 10/2002 |
| JP | 2008531162 | 8/2008 |
| JP | 20028280116 | 11/2008 |
| JP | 2009193115 | 8/2009 |
| NO | 324898 | 9/2006 |
| RU | 2006133310 | 4/2008 |
| WO | 9725634 | 7/1997 |
| WO | 9950172 | 10/1999 |
| WO | 0143088 | 6/2001 |
| WO | 0228241 | 4/2002 |
| WO | 0245559 | 6/2002 |
| WO | 2007003062 | 1/2004 |
| WO | 2004030435 | 4/2004 |
| WO | 2004030438 | 4/2004 |
| WO | 2006050563 | 5/2006 |
| WO | 2006063645 | 6/2006 |
| WO | 2006090183 | 8/2006 |
| WO | 2007003990 | 1/2007 |
| WO | 2008104751 | 9/2008 |
| WO | 2008138710 | 11/2008 |
| WO | 2008138820 | 11/2008 |
| WO | 2009016490 | 2/2009 |
| WO | 2009074550 | 6/2009 |

OTHER PUBLICATIONS

Chinese Office Action for Application No. 201080040119.1, dated Nov. 15, 2014, 8 pages.
Office Action issued in Japanese Application 2012-528341. dated Dec. 2, 2014. 5 pages.
Mara Bateman "The Concept of Just-in-Time Delivery and its Implications on the Marketing Strategy of a Company" Jul. 26, 2008; http://groundreport.com/the-concept-of-just-in-time-delivery-and-its-implications-on-the-marketing-strategy-of-a-company/.
PCT International Search Report for International Application No. PCT/EP2010/063096 with the Filing Date of Jul. 9, 2010, Date of Actual Completion Dec. 13, 2010, and dated Dec. 20, 2010, 3 sheets.
PCT Written Opinion of the International Searching Authority for International Application No. PCT/EP2010/063096 with an International Filing Date of Jul. 9, 2010, Date of Actual Completion Dec. 13, 2010, and dated Dec. 20, 2010.

* cited by examiner

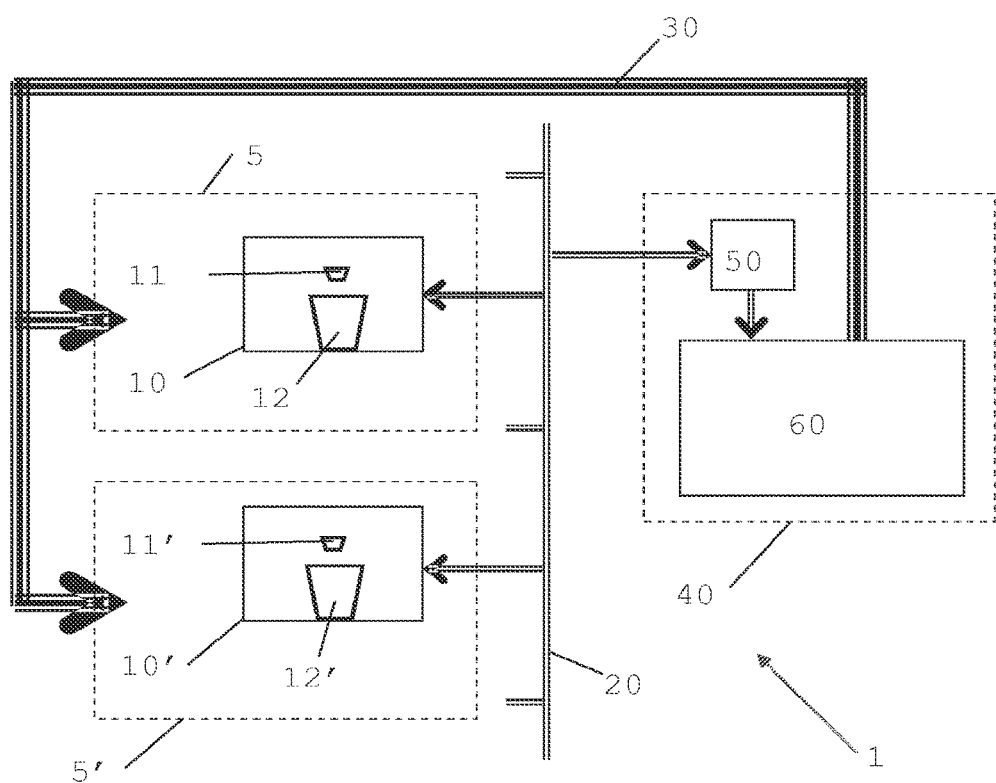

BEVERAGE MACHINE IN A NETWORK

CROSS REFERENCE TO RELATED APPLICATIONS

This application is a continuation of U.S. application Ser. No. 13/395,057, filed Mar. 8, 2012, which is a U.S. national stage filing of International Appl. PCT/EP2010/063096, filed on Sep. 7, 2010, which claims priority to European Patent Application No. 09169800.1 filed Sep. 9, 2009, the entire contents of which are incorporated herein by reference.

FIELD OF THE INVENTION

The field of the invention pertains to beverage preparation machines that are in a network, in particular a machine for preparing a beverage by extraction of an ingredient capsule.

For the purpose of the present description, a "beverage" is meant to include any liquid food, such as tea, coffee, hot or cold chocolate, milk, soup, baby food, etc. . . . . . A "capsule" is meant to include any pre-portioned beverage ingredient within an enclosing packaging of any material, in particular an airtight packaging, e.g. plastic, aluminium, recyclable and/or biodegradable packagings, and of any shape and structure, including soft pods or rigid cartridges containing the ingredient.

BACKGROUND

Certain beverage preparation machines use capsules containing ingredients to be extracted or to be dissolved; for other machines, the ingredients are stored and dosed automatically in the machine or else are added at the time of preparation of the drink.

Most coffee or other filling means that include beverage machines possess a pump for liquid, usually water, which pumps the liquid from a source of water that is cold or indeed heated through heating means, such as a heating resistor, a thermoblock or the like. Such filling means are usually controlled via a control unit of the machine, typically including a printed circuit board with a controller.

For allowing the user to interact with such machines, for providing operation instructions to the machine or obtaining feed-back therefrom, various systems have been disclosed in the art, for instance as mentioned in the following references: AT 410 377, CH 682 798, DE 44 29 353, DE 202 00 419, DE 20 2006 019 039, DE 2007 008 590, EP 1 302 138, EP 1 448 084, EP 1 676 509, EP 08155851.2, FR 2 624 844, GB 2 397 510, U.S. Pat. No. 4,377,049, U.S. Pat. No. 4,458,735, U.S. Pat. No. 4,554,419, U.S. Pat. No. 4,767,632, U.S. Pat. No. 4,954,697, U.S. Pat. No. 5,312,020, U.S. Pat. No. 5,335,705, U.S. Pat. No. 5,372,061, U.S. Pat. No. 5,375,508, U.S. Pat. No. 5,731,981, U.S. Pat. No. 5,645,230, U.S. Pat. No. 5,836,236, U.S. Pat. No. 5,959,869, U.S. Pat. No. 6,182,555, U.S. Pat. No. 6,354,341, U.S. Pat. No. 6,759,072, US 2007/0157820, WO 97/25634, WO 99/50172, WO 2004/030435, WO 2004/030438, WO 2006/063645, WO 2006/090183, WO 2007/003062, WO 2007/003990, WO 2008/104751, WO 2008/138710, WO 2008/138820 and WO 2009/016490.

WO 2009/016490 discloses a beverage dispenser having different beverage modules connected to a control unit with a graphic user interface (GUI) displaying automatically re-arrangeable virtual buttons. The control unit is re-programmed via a network to modify the operation of the modules, in particular the user interface, and for exchanging information about the operation of the machine.

EP 1 302 138 discloses a beverage machine connected to a network. The machine is arranged to communicate with a distant server to carry out diagnosis of the beverage machine and to update the machine's control software via the network.

Beverage preparation machines that can be integrated in a network such as the internet are well known. Typically, such a network integration allows remote control or remote software upgrading of the beverage preparation machine.

There is still a need to improve the services that are provided within a network that includes such beverage preparation machines at different distant locations.

SUMMARY

It is a preferred object of the present invention to provide a method involving a beverage preparation machine that can be connected to a remote supplier server in a network for preventing shortage at a customer location of consumable ingredient capsules.

The customer of the capsule supplier may be the end customer of the ingredient capsule or an intermediate customer, who resells the ingredient capsule to another customer, e.g. an end customer. This preferred object is generally achieved by providing a network arranged to simplify and rationalize ingredient capsule reordering, as discussed hereafter. Therefore, the invention relates to a method for preventing shortage at a customer location of consumable ingredient capsules for use in a machine for preparing a beverage by receiving a capsule in a capsule extraction unit, circulating a carrier liquid, such as water in particular heated water, through said capsule in the extraction unit and by dispensing a resulting beverage.

For instance, the machine is a coffee, tea, chocolate or soup preparation machine. In particular, the machine is arranged for preparing within the ingredient processing arrangement a beverage by passing hot or cold water or another liquid through a capsule containing an ingredient of the beverage to be prepared, such as ground coffee or tea or chocolate or cacao or milk powder.

For example, the preparation machine comprises: a ingredient processing arrangement including one or more of a liquid reservoir, liquid circulation circuit, a heater, a pump and a beverage preparation unit arranged to receive ingredient capsules for extraction and evacuate capsules upon extraction; a housing having an opening leading into a seat to which capsules are evacuated from the preparation unit; and a receptacle having a cavity forming a storage space for collecting capsules evacuated to the seat into the receptacle to a level of fill. The receptacle is insertable into the seat for collecting capsules and is removable from the seat for emptying the collected capsules. Examples of such ingredient processing arrangements are disclosed in WO 2009/074550 and in PCT/EP09/053368.

The beverage preparation machine at the customer location is distant from a capsule supplier and in data-exchange connection with a server of the capsule supplier to form a network.

Typically, the beverage preparation machine comprises: an arrangement for processing one or more beverage ingredients to dispense a beverage; a control unit connected to the ingredient processing arrangement for controlling the processing of the one or more beverage ingredients; and a communication module for communication with a network external to the beverage preparation machine. The machine is connectable to a data-exchange network, e.g. the internet or a similar network to which one or more distant computers, servers and terminals are connected for communicating with the communication module of the beverage preparation machine. The connection may also be achieved by a GPRS, GSM or other (direct) telephone communication system, in particular when the machines are not connectable to the internet.

The method of the invention comprises:
supplying from the capsule supplier a stock of consumable ingredient capsules at the customer location;
automatically monitoring via the network consumption of the consumable ingredient capsules in the beverage preparation machine;
and whenever the automatic monitoring detects a reaching of a shortage of consumable ingredient capsules at the customer location, generating automatically by the supplier server an instruction:
a) to invite the customer to make an order for a shipment of a new stock of capsules, or
b) to prepare a shipment of a new stock of capsules for supply to said customer.

Hence, the method of the invention provides an automatic monitoring of the consumption of capsules at the customer's location and provides either an automatic reordering of a new capsule stock when there is an expected shortage of capsules at the customer's location or an automatically generated invitation for the customer to order capsules. In the first instance, the capsule supply system is fully automated so that the customer does not have to take any action to be supplied in permanence with sufficient capsules. In the second 40 instance, the customer has to confirm a new order before a new shipment of capsules may be prepared by the suppliers. Hence, in the first instance, shortage of capsules at the customer location is prevented automatically. In the second instance, the customer is 5 assisted automatically to prevent shortage of capsules.

When the reordering system is fully automated, a means will be given to the customer, for example directly via the beverage preparation machine or via a PC connected to the network of via any other suitable means, to change his/her full-automatic ordering scheme. Such a means may of course be also provided when the system is semi-automatic, i.e. when the customer is invited to submit an order (or confirm an automatically generated proposal of an order) for a shipment of a new stock of capsules.

Usually, the network has a plurality of beverage preparation machines connected to a single supplier server, consumption of the consumable ingredient capsules in each beverage preparation machine being automatically monitored via the network. In such a case, it is possible to configure the network, in particular the supplier server, for full automatic reordering of capsules for at least one machine or customer, and for semi automatic reordering of capsules for at least one different machine or customers.

The server may generate automatically the above instruction a) or b) once the consumable capsule stock at the customer location is exhausted.

Preferably, the server generates automatically this instruction sufficiently in advance to permit timely shipment of a new stock of capsules for reaching the customer location at an estimated time of exhaustion of the consumable capsule stock at the customer location. Hence, the time needed for the preparation of the shipment, the duration of the shipment of the customer's location and the time until complete exhaustion of the consumable capsule stock at the customer's location may be estimated, e.g. inter-alia based on past consumption behaviour, and taken into account so that the customer does not experience any lack of availability of consumable capsules.

The beverage preparation machine can be arranged to automatically monitor the capsule consumption and send a capsule order to the supplier server whenever the automatic monitoring indicates a reaching of a shortage of consumable ingredient capsules at the customer location, the supplier server being arranged to receive the capsule order and to generate a corresponding instruction to prepare a shipment of a new stock of capsules for supply to the customer.

The beverage preparation machine may be arranged to communicate automatically the capsule consumption to the supplier server that is arranged to automatically monitor the capsule consumption and to generate the above instruction a) or b).

The machine's capsule extraction unit can be arranged to receive different types of ingredient capsules for preparing different beverages. For example, the extraction unit is arranged for receiving different coffee capsules types selected from capsules of arabica, robusta, canefora, etc. . . . and blends thereof, e.g. the NESPRESSO™ capsule ranges of capsule types, of the in-home or the out-of-home beverage machine standards.

In this case, the network is preferably arranged to differentiate between the consumption of capsules of the different types, the supplier server being arranged to generate automatically said instruction when a particular type of capsules reaches a level of shortage at the customer location. Hence, there is no need to wait until the customer has no capsules left at all to generate the above instruction a) or b). On the contrary, this instruction may be generated whenever on capsule type reaches a low level or is exhausted by the customer.

In an embodiment, the beverage preparation machine has an automatic capsule recognition arrangement.

For example, the capsule recognition system is of the type disclosed WO02/28241 which discloses a coffee machine using capsules with a machine interpretable feature that can be read automatically by the machine via a sensor. The machine interpretable feature on the capsule may include one or more of a colour, a shape, a glyph, a text string a barcode, a digital watermark, symbols, notches, grooves or holes.

For arranged instance, to receive the capsule different extraction unit is types of ingredient capsules for preparing different beverages, the automatic capsule recognition arrangement being arranged to identify the type of the capsules that are being used.

Indeed, when different capsule types are likely to be used in the same extraction unit, it is not sufficient to count the number of extraction processes carried out to derive the remaining capsule stock. The types of capsules should be identified by the machine so as to provide a differentiated management system aligned to the different capsule types.

Each shipped capsule stock can be individualised by a dedicated identification means comprised in each capsule of the stock, the automatic capsule recognition arrangement being arranged to identify the corresponding stock of each capsules that is being used. With such a system, it is possible to take into account when a customer is using capsules that have originally been supplied to a different customer or been acquired separately, without having been properly integrated into the monitoring scheme. It is thus possible to adjust the automatic monitoring of the capsule consumption by the different customers and their remaining consumable capsule stocks correspondingly. A feedback system maybe provided so that the customer may update manually the network on the effective level capsule stock. The feedback of his or her unused functionality may be triggered automatically when the network detects the use in the beverage preparation machine of a capsule that had not been assigned in the network to the particular customer using it.

When applicable, the supplier server may be arranged to invite the customer via e-mail, phone, fax or paper mail to make an order. The supplier server can be arranged to receive the order from the customer and generate automatically a corresponding instruction to prepare a shipment of a new stock of capsules for supply to the customer. The order can be received electronically by the supplier server, in particular via e-mail.

The beverage preparation machine may have an automatic capsule feeder for storing a plurality of consumable ingredient capsules and feeding individual capsules to the capsule extraction unit. Such beverage preparation machines are particularly suitable for out-of-home environments, such as restaurants, hotels, offices and other professional use.

Alternatively, the beverage preparation machine has a manual capsule insertion arrangement, for example for in-home or small office environments. In other words, the user will have to insert manually an ingredient capsule into the machine's extraction unit each time when he wishes a beverage to be prepared by the machine.

BRIEF DESCRIPTION OF THE DRAWINGS

The invention will now be described with reference to FIG. 1 which shows an arrangement for implementing a method according to the invention.

DETAILED DESCRIPTION

FIG. 1 schematically illustrates two beverage preparation machines 10,10' at different client locations 5,5'. Machines 10,10' are configured to prepare coffee from capsules containing ground coffee. Machines 10,10' are arranged for receiving a capsule in a capsule extraction unit, circulating heated water through the capsule in the extraction unit, and dispensing the resulting coffee beverage via an outlet 11,11' of the machine into a cup 12,12', as known in the art.

Beverage preparation machines 10,10 at client locations 5,5' are distant from a capsule supplier 40 and in data-exchange connection via a bidirectional data-transmission channel 20 with a sever 50 of the capsule supplier 40 to from a network 1, e.g. an internet-type or GPRS or similar network configuration.

In order to prevent shortage at client location 5,5' of consumable coffee capsules, the client are initially supplied with a stock of capsules. The manner by which the clients acquire the capsule is of little importance for the purpose of the invention. The stock of capsules of each client is entered into the network and assigned to each client.

The consumption of the consumable capsules in each beverage machine 10,10' is automatically monitored via network 1. For example the capsule consumption is counted in machines 10,10' and communicated to server 50 or each capsule consumption is communicated to server 50 and counted by the server.

When the number of consumed capsules with a machine 10,10' approaches the number of capsules of the previously supplied capsule stock to the corresponding location 5,5', the automatic monitoring via network 1 detects a reaching of a shortage of non-used coffee capsules at this location. As a consequence server 50 generates automatically an instruction:

a) to invite the client to make an order for a shipment of a new stock of capsules, or b) to prepare a shipment of a new stock of capsules for supply to this client.

The application of step a) or step b) may depend on the particular commercial arrangement between the capsule supplier and a particular client.

Once the a shipment of a new stock of capsules has been ordered, e.g. automatically upon reaching a low level of capsules at a client location 5,5' or automatically upon confirmation by the client, e.g. via 30 e-mail, of an order suggested by server 50, the shipment is prepared and dispatched from capsule dispatching centre 50 at the supplier's location 40 or from a different location to the relevant client location 5,5' via any appropriate means 30, e.g. postal delivery service.

The invention is claimed as follows:

1. A system for preventing a shortage of consumable ingredient capsules at a customer location distant from a capsule supplier, the system comprising:
   a beverage preparation machine configured to receive a capsule in a capsule extraction unit, circulate a carrier liquid through the capsule in the extraction unit, and dispense a resulting beverage, wherein stocks of consumable ingredient capsules are supplied from the capsule supplier to the customer location, the beverage preparation machine programmed to (1) perform automatic monitoring of consumption of the consumable ingredient capsules in the beverage preparation machine and (2) automatically generate an instruction whenever the automatic monitoring indicates a reaching of a shortage of the consumable ingredient capsules at the customer location,
   wherein the beverage preparation machine comprises an automatic capsule recognition arrangement, each of the stocks is individualized by a dedicated identification member located in each capsule of the stock, and the automatic capsule recognition arrangement identifies the corresponding stock of each capsule used in the beverage preparation machine.

2. The system of claim 1, wherein the capsule extraction unit is arranged to receive different types of ingredient capsules for preparing different beverages, and the automatic capsule recognition arrangement is arranged to identify the type of the capsules that are used in the extraction unit.

3. A method of preventing a shortage of consumable ingredient capsules at a customer location at which a beverage preparation machine is positioned, the customer location distant from a capsule supplier, the method comprising:
   receiving one or more of the consumable ingredient capsules in a capsule extraction unit of the beverage preparation machine;
   circulating a carrier liquid through the one or more of the consumable ingredient capsules in the extraction unit;
   dispensing a resulting beverage from the beverage preparation machine for each of the one or more of the consumable ingredient capsules;
   identifying the corresponding stock of each capsule used in the beverage preparation machine;
   automatically monitoring consumption of the consumable ingredient capsules in the beverage preparation machine;

automatically generating an instruction whenever the automatic monitoring indicates a reaching of a shortage of the consumable ingredient capsules at the customer location; and supplying stocks of consumable ingredient capsules from the capsule supplier to the customer location, each of the stocks is individualized by a dedicated identification member located in each capsule of the stock, and the identifying of the corresponding stock is performed by an automatic capsule recognition arrangement of the beverage preparation machine.

\* \* \* \* \*